(12) United States Patent
Ueki (10) Patent No.: US 9,951,842 B2
(45) Date of Patent: Apr. 24, 2018

(54) VIBRATION-DAMPING DEVICE

(71) Applicant: BRIDGESTONE CORPORATION, Tokyo (JP)

(72) Inventor: Akira Ueki, Tokyo (JP)

(73) Assignee: BRIDGESTONE CORPORATION, Chuo-ku, Tokyo (JP)

( * ) Notice: Subject to any disclaimer, the term of this patent is extended or adjusted under 35 U.S.C. 154(b) by 0 days.

(21) Appl. No.: 15/311,065

(22) PCT Filed: Mar. 13, 2015

(86) PCT No.: PCT/JP2015/057439
§ 371 (c)(1),
(2) Date: Nov. 14, 2016

(87) PCT Pub. No.: WO2015/186400
PCT Pub. Date: Dec. 10, 2015

(65) Prior Publication Data
US 2017/0089421 A1    Mar. 30, 2017

(30) Foreign Application Priority Data

Jun. 5, 2014 (JP) ................................. 2014-116810

(51) Int. Cl.
*F16F 13/10* (2006.01)

(52) U.S. Cl.
CPC ............ *F16F 13/107* (2013.01); *F16F 13/10* (2013.01)

(58) Field of Classification Search
CPC ......... F16F 13/10; F16F 13/105; F16F 13/107
(Continued)

(56) References Cited

U.S. PATENT DOCUMENTS 7,334,783 B2  2/2008  Yoneyama et al.
8,157,250 B2  4/2012  Lee
(Continued)

FOREIGN PATENT DOCUMENTS

CN       1796821 A    7/2006
CN     101413563 A    4/2009
(Continued)

OTHER PUBLICATIONS

Communication dated May 4, 2017 issued by the European Patent Office in counterpart application No. 15803575.8.
(Continued)

Primary Examiner — Vishal R Sahni
(74) Attorney, Agent, or Firm — Sughrue Mion, PLLC (57) ABSTRACT

A vibration-damping device (10) in the present application includes a first limiting passage (51) and a second limiting passage (52). The first limiting passage (51) includes pressure loss units (53*a*, 53*b*). Each of the pressure loss units (53*a*, 53*b*) is provided with an intermediate chamber (55), a first communication passage (57), and a second communication passage (58). An opening axis (L1) of a first opening (59) that opens toward the inside of the intermediate chamber (55) in the first communication passage (57) and an opening axis (L2) of a second opening (60) that opens toward the inside of the intermediate chamber (55) in the second communication passage (58) are offset from each other. At least one of the first opening (59) and the second opening (60) opens toward a wall surface that defines the intermediate chamber (55). The pressure loss units (53*a*, 53*b*) include a first pressure loss unit (53*a*) in which the first communication passage (57) directly communicates with the first liquid chamber (14) and the first opening (59) opens toward the wall surface that defines the intermediate chamber (55). In the first pressure loss unit (53*a*), a portion that faces the first opening (59) and that is in the wall surface that defines the intermediate chamber (55), is formed by the elastic membrane (39).

3 Claims, 5 Drawing Sheets

(58) Field of Classification Search
USPC .................................................. 267/140.13
See application file for complete search history.

(56) References Cited

U.S. PATENT DOCUMENTS

| | | | |
|---|---|---|---|
| 2006/0097435 A1 | 5/2006 | Yoneyama et al. | |
| 2010/0102492 A1 | 4/2010 | Lee | |
| 2011/0210488 A1* | 9/2011 | Yamamoto | F16F 13/106 267/140.13 |
| 2012/0228813 A1* | 9/2012 | Masuda | F16F 13/106 267/140.13 |
| 2016/0102728 A1* | 4/2016 | Ueki | F16F 13/107 267/140.13 |
| 2016/0131219 A1* | 5/2016 | Ueki | F16F 13/107 267/140.13 |
| 2016/0160956 A1* | 6/2016 | Ueki | F16F 13/107 267/140.13 |
| 2016/0245364 A1* | 8/2016 | Ueki | F16F 13/107 |
| 2017/0023091 A1* | 1/2017 | Ueki | F16F 13/10 |
| 2017/0030428 A1* | 2/2017 | Ueki | B60K 5/1208 |

FOREIGN PATENT DOCUMENTS

| | | |
|---|---|---|
| CN | 101725796 A | 6/2010 |
| CN | 201963802 U | 9/2011 |
| JP | 60-73147 A | 4/1985 |
| JP | 2006-250339 A | 9/2006 |
| JP | 2007-120598 A | 5/2007 |
| JP | 2008-215529 A | 9/2008 |
| JP | 2014-31850 A | 2/2014 |

OTHER PUBLICATIONS

International Search Report of PCT/JP2015/057439, dated May 19, 2015. [PCT/ISA/210].
Communication dated Mar. 2, 2018, from State Intellectual Property Office of the P.R.C. in counterpart application No. 201580028841.6.

* cited by examiner

VIBRATION-DAMPING DEVICE

CROSS REFERENCE TO RELATED APPLICATIONS

This application is a National Stage of International Application No. PCT/JP2015/057439 filed Mar. 13, 2015, claiming priority based on Japanese Patent Application No. 2014-116810, filed Jun. 5, 2014, the contents of all of which are incorporated herein by reference in their entirety.

TECHNICAL FIELD

The present invention relates to a vibration-damping device that is applied to, for example, automobiles, industrial machines, or the like, and absorbs and damps vibrations of vibration generating parts, such as engines.

Priority is claimed on Japanese Patent Application No. 2014-116810 filed Jun. 5, 2014, the content of which is incorporated herein by reference.

BACKGROUND ART

Conventionally, as this type of vibration-damping device, for example, a configuration described in the following Patent Document 1 has been known. This vibration-damping device includes a tubular first attachment member that is coupled to any one of a vibration generating part and a vibration receiving part, a second attachment member that is coupled to the other thereof, an elastic body that couples both the attachment members together, and a partition member that partitions a liquid chamber within the first attachment member having a liquid enclosed therein into a first liquid chamber and a second liquid chamber. A limiting passage that allows both of the liquid chambers to communicate with each other is formed in the partition member. A first limiting passage of the limiting passage that resonates with input of a first vibration, and a second limiting passage of the limiting passage that resonates with input of a second vibration with a greater amplitude than the amplitude of the first vibration. The partition member is provided with a plunger member.

In this vibration-damping device, the limiting passage through which a liquid flows between both of the liquid chambers is switched by moving the plunger member to open and close the first limiting passage when vibration is input. Accordingly, the liquid flows through the first limiting passage when the first vibration is input, and the liquid flows through the second limiting passage when the second vibration is input.

CITATION LIST

Patent Document

[Patent Document 1] Japanese Unexamined Patent Application, First Publication No. 2007-120598

SUMMARY OF INVENTION

Technical Problem

However, in the related-art vibration-damping device, there is room for improvement in simplification of structure, and facilitation of manufacture.

The invention has been made in view of the aforementioned circumstances, and an object thereof is to provide a vibration-damping device that can achieve simplification of structure and facilitation of manufacture.

Solution to Problem

In order to solve the above problems, the invention suggests the following means. A vibration-damping device related to the invention includes a tubular first attachment member coupled to any one of a vibration generating part and a vibration receiving part, and a second attachment member coupled to the other thereof; an elastic body coupling both of the attachment members; and a partition member that partitions a d chamber within the first attachment member having a liquid enclosed therein into a first liquid chamber and a second liquid chamber. At least the first liquid chamber of the first liquid chamber and the second liquid chamber has the elastic body on a portion of a wall surface thereof. A limiting passage that allows the first liquid chamber and the second liquid chamber to communicate with each other is formed in the partition member. A first limiting passage of the limiting passage that resonates with input of a first vibration, and a second limiting passage of the limiting passage that resonates with input of a second vibration with a greater amplitude than the amplitude of the first vibration. The first limiting passage includes a pressure loss unit that causes a loss in the pressure of the liquid that flows therethrough. The pressure loss unit is provided with an intermediate chamber disposed in the partition member, a first communication passage that allows the intermediate chamber and the first liquid chamber to communicate with each other, and a second communication passage that allows the intermediate chamber and the second liquid chamber to communicate with each other. An opening axis of a first opening that opens toward an inside of the intermediate chamber in the first communication passage and an opening axis of a second opening that opens toward an inside of the intermediate chamber in the second communication passage are offset from each other. At least one of the first opening and the second opening opens toward a wall surface that defines the intermediate chamber. A first pressure loss unit of the pressure loss unit in which the first communication passage directly communicates with the first liquid chamber and the first opening opens toward the wall surface that defines the intermediate chamber. In the first pressure loss unit, a portion that faces the first opening and that is in the wall surface that defines the intermediate chamber is formed by the elastic membrane.

In this case, if vibration is input to the vibration-damping device, the first attachment member and the second attachment member are relatively displaced while elastically deforming the elastic body. In this case, the liquid tends to flow through the first limiting passage between the first liquid chamber and the second liquid chamber.

Here, if the first vibration is input, a small amount of the liquid per unit time tends to flow into the first limiting passage according to the amplitude of the first vibration. As a result, a rise in the flow speed of the liquid that flows through the first limiting passage is suppressed. Accordingly, the liquid passes through a short path within the intermediate chamber of the pressure loss unit, the pressure loss of the liquid within the pressure loss unit is suppressed, and the liquid smoothly flows through the first limiting passage. Therefore, it is possible to make the liquid actively flow through the first limiting passage, and resonance within the first limiting passage can be used to adsorb and dampen the first vibration.

Meanwhile, if the second vibration is input, a large amount of the liquid per unit time tends to flow into the first limiting passage according to the amplitude of the second vibration. As a result, the flow speed of the liquid that flows through the first limiting passage increases. By the way, in this vibration-damping device, at least one of the first opening or the second opening opens toward the wall surface that defines the intermediate chamber in the pressure loss unit. Therefore, if the flow speed of the liquid that flows into the intermediate chamber through this opening increases, the liquid flows straight within the intermediate chamber and reaches the wall surface. Then, the liquid is flowed along the wall surface, and reaches an opening different from the opening through which this liquid is flowed into the intermediate chamber, and flows out of the intermediate chamber. Hence, in a case where the second vibration is input, compared to a case where the first vibration is input, the liquid can be flowed along a long path within the intermediate chamber, and friction can be caused between the liquid and the wall surface of the intermediate chamber. As a result, a large loss can be caused in energy, and the pressure loss of the liquid can be increased.

This can make it difficult for the liquid to flow through the first limiting passage, thereby easily making the liquid flow through the second limiting passage. In this case, as the liquid flows through the second limiting passage, resonance can be caused within the second limiting passage, and the second vibration can be absorbed and dampened.

If resonance occurs the second limiting passage in this way, the liquid pressure of the first liquid chamber, having the elastic body on a portion of the wall surface thereof, out of the first liquid chamber and the second liquid chamber greatly fluctuate with this resonance. Here, in the vibration-damping device, the first communication passage of the first pressure loss unit directly communicates with the first liquid chamber, and in the first pressure loss unit, the portion that faces the first opening in the wall surface that defines the intermediate chamber is formed by the elastic membrane. Therefore, if the liquid pressure of the first liquid chamber fluctuates greatly as mentioned above, this liquid pressure can be radially transmitted to the elastic membrane through the first communication passage and the intermediate chamber in the first pressure loss unit. As a result, the elastic membrane can be elastically deformed on the basis of fluctuations of the liquid pressure of the first liquid chamber. In this case, the first opening can be closed by the elastic membrane by the elastic membrane being elastically deforming toward the first opening of the first pressure loss unit. This can make it more difficult for the liquid to flow through the first limiting passage, thereby more easily making the liquid flow through the second limiting passage. Therefore, for example, even if the second vibration with a small amplitude is input the liquid can be made to reliably flow through the second limiting passage.

As a result, even the second vibration with a small amplitude can be reliably absorbed and dampened.

As described above, both the first vibration and the second vibration can be absorbed and dampened by providing the pressure loss unit in the first limiting passage instead of providing the plunger member as in the related art in the partition member. Accordingly, simplification of structure and facilitation of manufacture in the vibration-damping device can be achieved.

A second pressure loss unit of the pressure loss unit in which the second communication passage directly communicates with the second liquid chamber and the second opening opens toward the wall surface that defines the intermediate chamber. The intermediate chamber of the first pressure loss unit and the intermediate chamber of the second pressure loss unit may be adjacent to each other with the elastic membrane interposed therebetween. In the second pressure loss unit, a portion that faces the second opening and that is in the wall surface that defines the intermediate chamber may be formed by the elastic membrane.

In this case, the intermediate chamber of the first pressure loss unit, and the mediate chamber of the second pressure loss unit are adjacent to each other with the elastic membrane interposed therebetween. Therefore, when the second vibration is input, the elastic membrane is elastically deformed to the intermediate chamber side of the first pressure loss unit or the intermediate chamber side of the second pressure loss unit, on the basis of the difference between the liquid pressure received from the intermediate chamber of the first pressure loss unit and the liquid pressure received from the intermediate chamber of the second pressure loss unit. Here, in the vibration-damping device, the second communication passage of the second pressure loss unit directly communicates with the second liquid chamber, and in the second pressure loss unit, the portion that faces the second opening in the wall surface that defines the intermediate chamber is formed by the elastic membrane. Therefore, when the second vibration is input, the liquid pressure that the elastic membrane receives from the intermediate chamber of the second pressure loss unit can be made equal to the liquid pressure of the second liquid chamber. Accordingly, when the second vibration is input, it is possible to increase the difference between the liquid pressure that the elastic membrane receives from the intermediate chamber of the first pressure loss unit, and the liquid pressure that the elastic membrane receives from the intermediate chamber of the second pressure loss unit, and the elastic membrane can be elastically deformed to the intermediate chamber side of the first pressure loss unit or to the intermediate chamber side of the second pressure loss unit. If the elastic membrane is deformed to the intermediate chamber side of the first pressure toss unit, the first opening of the first pressure loss unit can be closed by the elastic membrane as mentioned above. Meanwhile, if the elastic membrane is deformed to the intermediate chamber side of the second pressure loss unit, the second opening of the second pressure loss unit can be closed by the elastic membrane.

From above, even when the second vibration with a small amplitude is input, the first opening of the first pressure loss unit or the second opening of the second pressure loss unit can be easily closed by the elastic membrane. As a result, it can be more difficult for the liquid to flow through the first limiting passage, and thereby the liquid can be made to more easily flow through the second limiting passage.

Any one of the first communication passage and the second communication passage may open in a circumferential direction of the intermediate chamber within the intermediate chamber. A swirling flow of the liquid may be formed within the intermediate chamber according to a flow speed of the liquid flowed into the intermediate chamber. The liquid is flowed out of the other of the first communication passage and the second communication passage.

In this case, if the flow speed of the liquid that has flowed into the inter chamber from any one of the first communication passage and the second communication passage is sufficiently high when the liquid flows through the intermediate chamber, the swirling flow of the liquid can be formed in the intermediate chamber. Then, the pressure loss of the liquid can be efficiently increased, for example, due to an energy loss caused by forming this swirling flow, an energy loss caused by the friction between the liquid and the wall surface of the intermediate chamber, or the like.

Meanwhile, if the flow speed of the liquid is low, the swirling of the liquid in the intermediate chamber can be suppressed. Accordingly, the liquid can be made to smoothly pass through the intermediate chamber, and an increase in the pressure loss of the liquid can be suppressed.

In the first pressure loss unit, a portion, which is provided with the first opening and faces the elastic membrane, in the wall surface that defines the intermediate chamber may be formed in the shape of a convexly curved surface that becomes convex toward the elastic membrane.

In this case, in the first pressure loss unit, a portion, which is provided with the first opening and faces the elastic membrane, in the wall surface that defines the intermediate chamber is formed in the shape of a convexly curved surface that becomes convex toward the elastic membrane. Therefore, when the elastic membrane is elastically deforms toward the first opening to close the first opening, the contact area between the elastic membrane and the wall surface of the intermediate chamber can be gradually increased. Accordingly, for example, generation of striking sound can be suppressed.

Advantageous Effects of Invention

According to the invention, simplification of structure and facilitation of manufacture in the vibration-damping device can be achieved.

DESCRIPTION OF EMBODIMENTS

Hereinafter, an embodiment of a vibration-damping device related to the invention will be described, referring to FIGS. 1 to 6.

Figure 1:
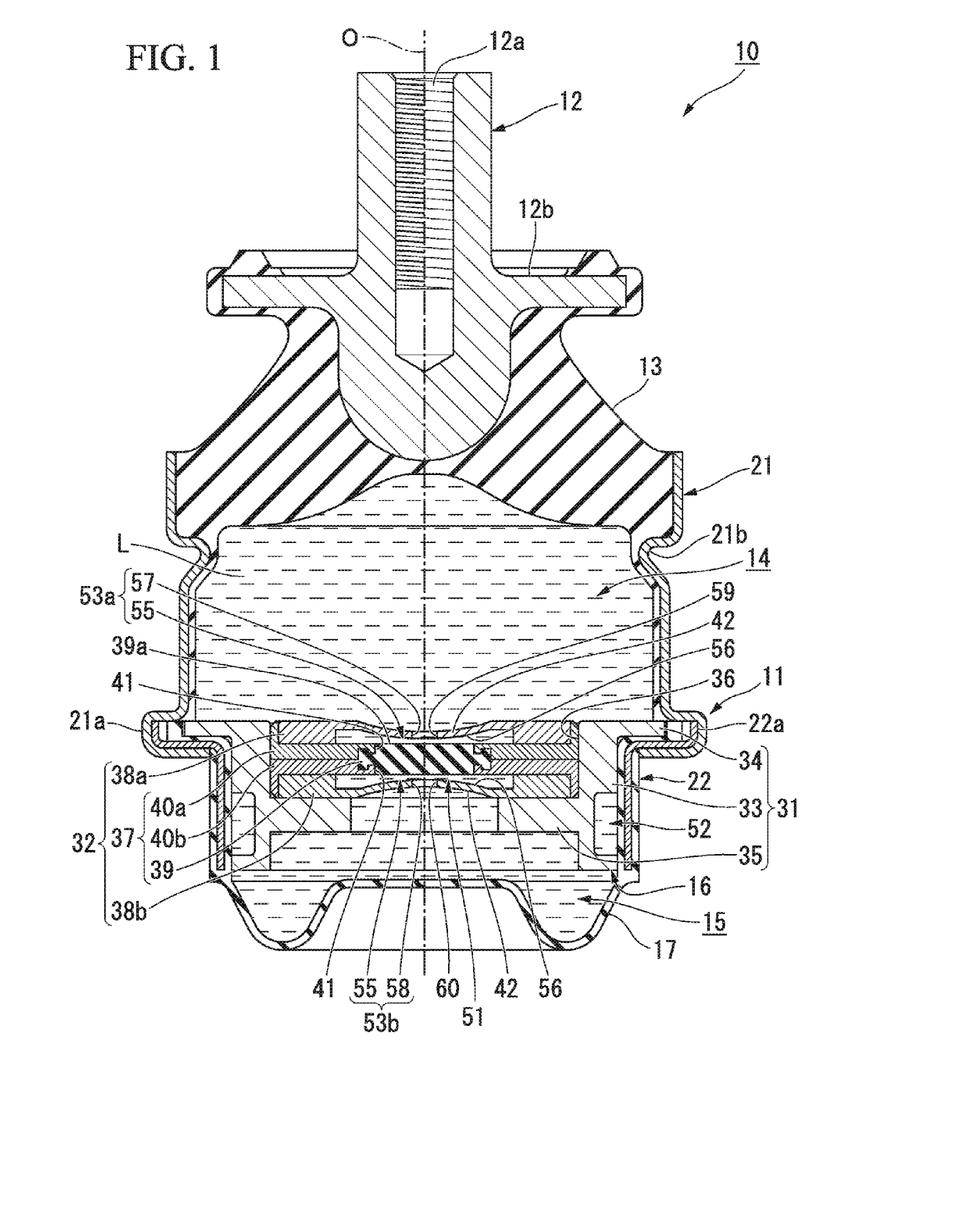
FIG. 1 is longitudinal sectional view of a vibration-damping device related to an embodiment of the invention.

The vibration-damping device 10, as is shown in FIG. 1, includes a tubular first attachment member 11 that is coupled to any one of a vibration generating part and a vibration receiving part, a second attachment member 12 that is coupled to the other thereof, an elastic body 13 that couples both the attachment members 11 and 12 together, and a partition member 16 that partitions a liquid chamber within the first attachment member 11 in which a liquid is enclosed, into a main liquid chamber (first liquid chamber) 14 that has the elastic body 13 as a portion of the wall surface thereof, and an auxiliary liquid chamber (second liquid chamber) 15.

In the shown example, the second attachment member 12 is formed in a columnar shape, the elastic body 13 is formed in a tubular shape, and the first attachment member 11, the second attachment member 12, and the elastic body 13 are disposed coaxially with a common axis. Hereinafter, this common axis is referred to as an axis O (an axis of the first attachment member), a main liquid chamber 14 side in a direction of the axis O is referred to as first side, an auxiliary liquid chamber 15 side is referred to as the second side, a direction orthogonal to the axis O is referred to as a radial direction, and a direction going around the axis O is referred to as a circumferential direction.

In addition, In a case where the vibration-damping device 10 is mounted on, for example, an automobile, the second attachment member 12 is coupled to an engine serving as the vibration generating part and the first attachment member 11 is coupled to a vehicle body serving as the vibration receiving part via a bracket (not shown), whereby vibration of the engine is restrained from being transmitted to the vehicle body. The vibration-damping device 10 is of a liquid-enclosed type in which, for example, the liquid L, such as ethylene glycol, water, or silicone oil, is enclosed in a liquid chamber of the first attachment member 11.

The first attachment member 11 includes one outer tube body 21 located on first side in the direction of the axis O, and the other outer tube body 22 located on the second side in the direction of the axis O.

The elastic body 13 is coupled to one end of the one outer tube body 21 in a liquid-tight state, and one opening of the one outer tube body 21 is closed by the elastic body 13. The other end 21a of the one outer tube body 21 is formed with a greater diameter than the other portions. The inside of the one outer tube body 21 serves as the main liquid chamber 14. The liquid pressure of the main liquid chamber 14 fluctuates when the elastic body 13 is deformed and the internal volume of the main liquid chamber 14 changes at the time of the input of vibration.

In addition, an annular groove 21b that extends continuously over the whole circumference of the one outer tube body 21 is formed in the portion of the one outer tube body 21 that is connected from the second side opposite to the portion thereof to which the elastic body 13 is coupled.

A diaphragm 17 is coupled to the other end of the other outer tube body 22 in a liquid-tight state, and the other opening of the other outer tube body 22 is closed by the diaphragm 17. One end 22a of the other outer tube body 22 is formed with a greater diameter than the other portions, and is fitted the other end 21a of the one outer tube body 21. Additionally, the partition member 16 is fitted into the other outer tube body 22, and a portion of the other outer tube body 22 located between the partition member 16 and the diaphragm 17 serves as the auxillary liquid chamber 15. The auxiliary liquid chamber 15 has the diaphragm 17 as a portion of a wall surface thereof, and is expanded and contracted when the diaphragm 17 is deformed. In addition, the other outer tube body 22 is covered substantially over the entire region with a rubber membrane formed integrally with the diaphragm 17.

A female thread part 12a is formed coaxially with the axis O in one end surface of the second attachment member 12. The second attachment member 12 protrudes from the first attachment member 11 to the first side. A flange part 12b that protrudes toward an outer side in a radial direction and continuously extends over the entire circumference thereof is formed in the second attachment member 12. The flange part 12b is separated from one end edge of the first attachment member 11 the first side.

The elastic body 13 is formed of, for example, a rubber material or the like capable of being elastically deformed, and is formed in a tubular shape that has a gradually increased diameter from the first side toward the second side. One end of the elastic body 13 is coupled to the second attachment member 12, and the other end thereof is coupled to the first attachment member 11.

In addition, an inner peripheral surface of the one outer tube body 21 of the first attachment member 11 is covered substantially over the entire region with the rubber membrane formed integrally with the elastic body 13.

The partition member 16 is fitted into the first attachment member 11. The partition member 16 includes a body part 31 and a mounting part 32. The body part 31 includes a tubular part 33, a flange part 34, and a support part 35.

The tubular part 33 is fitted into the other outer tube body 22 of the first attachment member 11. The flange part 34 is provided at one end of the tubular part 33. The flange part 34 protrudes annularly from the tubular part 33 toward the outer side in the radial direction. The flange part 34 is disposed within the one end 22a of the other outer tube body 22. The support part 35 is provided at an intermediate part of the tubular part 33 in the direction of the axis O. The support part 35 protrudes annularly from the tubular part 33 toward an inner side in a radial direction.

The body part 31 is provided with a mounting recess 36. The mounting recess 36 is disposed coaxially with the axis O, and opens toward the first side. The mounting recess 36 is defined b the tubular part 33 and the support part 35. The mounting recess 36 opens toward the second side through the inside of the support part 35.

The mounting part 32 is mounted within the mounting recess 36. The mounting part 32 and the body part 31 are fixed with, for example, bolts (not shown).

The mounting part 32 includes a base part 37 and space-form parts 38a and 38b. The base part 37 is fitted into the mounting recess 36. The base part 37 includes an elastic membrane 39 and rigid wall members 40a and 40b. The elastic membrane 39 is disposed coaxially with the axis O.

The elastic membrane 39 is formed in a circular shape in a plan view as seen from the direction of the axis O.

A pair of the rigid wall members 40a and 40b is provided to sandwich the elastic membrane 39 therebetween in the direction of the axis O. One first rigid wall member 40a and the other second rigid wall member 40b are provided as the rigid wall members 40a and 40b. The first rigid wall member 40a and the second rigid wall member 40b are formed with the same shape as each other and with the same size as each other. The first rigid wall member 40a and the second rigid wall member 40b are disposed in an orientation in which these members are reversed to each other in the direction of the axis O.

The first rigid wall member 40a is formed in a bottomed tubular shape, and the second rigid wall member 40b is formed in a topped tubular shape. The first rigid wall member 40a and the second rigid wall member 40b are disposed coaxially with the axis O. Through-holes 41 are separately formed in a bottom wall part of the first rigid wall member 40a and a top wall part of the second rigid wall member 40b. Each through-hole 41 is disposed coaxially with the axis O, and passes through the first rigid wall member 40a or the second rigid wall member 40b in the direction of the axis O.

A peripheral edge of the through-hole 41 in the first rigid wall member 40a and a peripheral edge of the through-hole 41 in the second rigid wall member 40b sandwich an outer peripheral edge of the elastic membrane 39 over the entire circumference. An exposed part 39a located closer to an inner side than outer peripheral edge in the elastic membrane 39 is disposed within each through-hole 41. Accordingly, the exposed part 39a of the elastic membrane 39 is exposed in the direction of the axis O. An end surface of the exposed part 39a of the elastic membrane 39 that faces the direction of the axis O is formed to be flush with an inner surface in the bottom wall part of the first rigid wall member 40a and an inner surface in the top wall part of the second rigid wall member 40b, respectively.

A pair of the space-form parts 38a and 38b are provided. One first space-form part 38a and the other second space-form part 38b are provided as the space-form parts 38a and 38b. The first space-form part 38a and the second space-form part 38b are formed with the same shape as each other and with the same size as each other. The first space-form part 38a and the second space-form part 38b are disposed in an orientation in which these parts are reversed to each other in the direction of the axis O.

The first space-form part 38a is formed in a topped tubular shape. The first space-form part 38a is fitted into the first rigid wall member 40a. A space is defined between the first space-form part 38a, the bottom wall part of the first rigid wall member 40a, and the elastic membrane 39. This space becomes an intermediate chamber 55 of a first pressure loss unit 53a to be described below.

A top wall part of the first space-form part 38a is provided with an overhang part 42 that overhangs toward a lower side. The overhang part 42 faces the elastic membrane 39 in the direction of the axis O, and is disposed coaxially with the axis O. The overhang part 42 is formed in a spherical shape that becomes convex toward the lower side.

The second space-form part 38b is formed in a bottomed tubular shape. The second space-form part 38b is fitted into the second rigid wall member 40b. A space is defined between the second space-form part 38b, a bottom wall part of the second rigid ember 40b, and the elastic membrane 39. This space becomes an intermediate chamber 55 of a second pressure loss unit 53b to be described below.

A bottom wall part of the second space-form part 38b is provided with an overhang part 42 that overhangs toward an upper side. The overhang part 42 faces the elastic membrane 39 in the direction of the axis O, and is disposed coaxially with the axis O. The overhang part 42 is formed in a spherical shape that becomes convex toward the upper side.

Limiting passages 51 and 52 that allow the main liquid chamber 14 and the auxiliary liquid chamber 15 to communicate with each other are formed in the partition member 16. A first limiting passage 51 (idle orifice) and a second limiting passage 52 (shake orifice) are provided as the limiting passages 51 and 52.

The second limiting passage 52 is provided at an outer peripheral part of the partition member 16. The second limiting passage 52 is provided in the body part 31 over the entire length. The flow passage cross-sectional area of the second limiting passage 52 is equal over the entire length of the second limiting passage 52.

Figure 2:
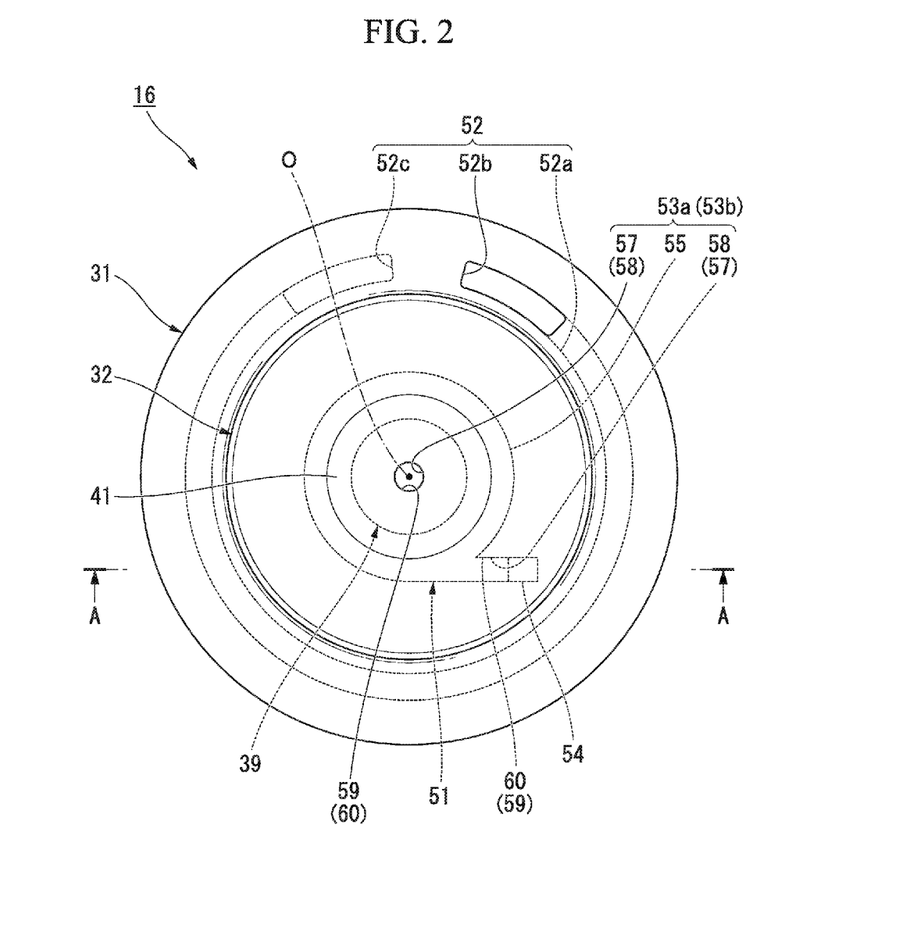
FIG. 2 is a plan view of the partition member that constitutes vibration-damping device shown in FIG. 1.

As shown in FIGS. 1 and 2, the second limiting passage 52 includes a circumferential groove part 52a, a main opening 52b, and an auxiliary opening 52c. The circumferential groove part 52a extends in the circumferential circumferential direction in the outer peripheral surface of the partition member 16, and is closed from the outer side in the radial direction by an inner peripheral surface of the first attachment member 11. One end of the two ends of the circumferential groove part 52a in the circumferential direction communicates with the main liquid chamber 14 through the main opening 52b and the other end thereof communicates with the auxiliary liquid chamber 15 through the auxiliary opening 52c.

The first limiting passage 51 is independent the second limiting passage 52 within the partition member 16, and a flow passage is not made to serve a double purpose. The first limiting passage 51 is formed in a portion of the partition member 16 that is located closer to the inner side in the radial direction than the outer peripheral part.

As shown in FIGS. 1 to 4, the first limiting passage 51 includes the pressure loss units 53b and 53b and a connection passage 54. The pressure loss units 53a and 53b cause a loss in the pressure of the liquid L that flows therethrough. The first pressure loss unit 53a and the second pressure loss unit 53b are provided as the pressure loss units 53a and 53b. The first pressure loss unit 53a is formed in the first space-form part 38a, and directly communicates with the main liquid chamber 14. The second pressure loss unit 53b is formed in the second space-form part 38b, and directly communicates with the auxiliary liquid chamber 15. The connection passage 54 allows the first pressure loss unit 53a and second pressure loss unit 53b to communicate with each other.

As shown in FIG. 1, each pressure loss unit 53a or 53b is provided with the intermediate chamber 55 disposed within the partition member 16. In the first pressure loss unit 53a, the intermediate chamber 55 is defined between the first space-form part 38a, the bottom wall part of the first rigid wall member 40a, and the elastic membrane 39. In the second pressure loss unit 53b, the intermediate chamber 55 is defined between the second space-form part 38b, the bottom wall part of the second rigid wall member 40b, and the elastic membrane 39.

The intermediate chamber 55 of the first pressure loss unit 53a, and the intermediate chamber 55 of the second pressure loss unit 53b are adjacent to each other in the direction of the axis O with the elastic membrane 39 interposed therebetween. The respective intermediate chambers 55 of the first pressure loss unit 53a and the second pressure loss unit 53b are formed with the same shape as each other and with the same size as each other, and are formed in a circular shape in the above plan view. In addition, in each pressure loss units 53a or 53b, a facing wall surface 56, which is a portion that faces the elastic membrane 39, in a wall surface that define the intermediate chamber 55 is formed by the overhang part 42. Accordingly, the facing wall surface 56 is formed in the shape of a convexly curved surface that becomes convex toward the elastic membrane 39.

Each pressure loss unit 53a or 53b is further provided with a first communication passage 57 that allows the intermediate chamber 55 and the main liquid chamber 14 communicate with each other, and a second communication passage 58 that allows the intermediate chamber 55 and the auxiliary liquid chamber 15 communicate with each other. In each pressure loss unit 53a or 53b, an opening axis (hereinafter referred to as a "first opening axis") L1 of a first opening 59, which opens toward the inside of the intermediate chamber 55, in the first communication passage 57, and an opening axis (hereinafter referred to as a "second opening axis") L2 of a second opening 60, which opens toward the inside of the intermediate chamber 55, in the second communication passage 58 are offset each other. In each pressure loss unit 53a or 53b, at least one of the first opening 59 and the second opening 60 opens toward a wall surface that defines the intermediate chamber 55, and both of the first opening 59 and the second opening 60 open toward the wall surface that defines the intermediate chamber 55.

Figure 4:
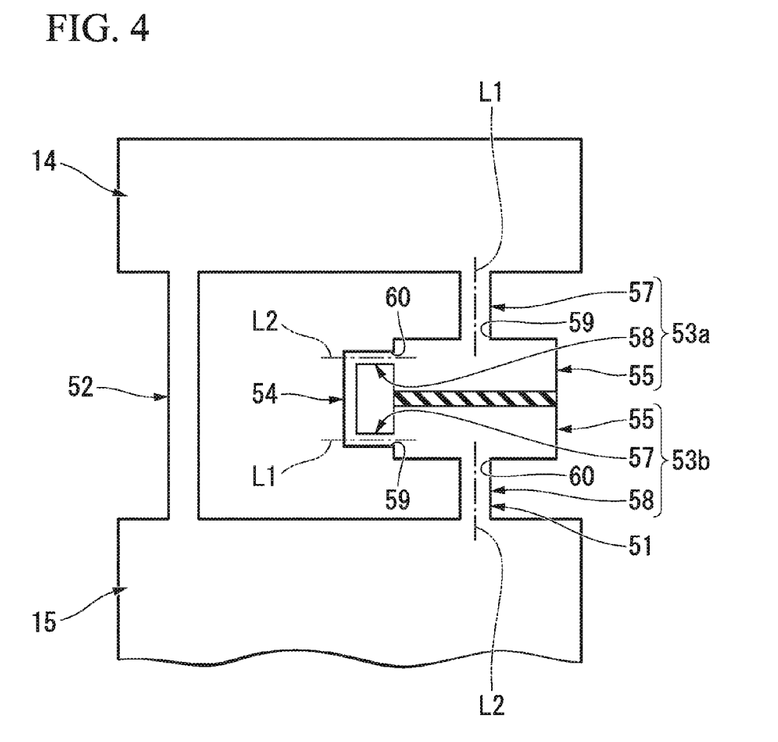
FIG. 4 is a schematic view of the vibration-damping device shown in FIG. 1.
Figure 5:
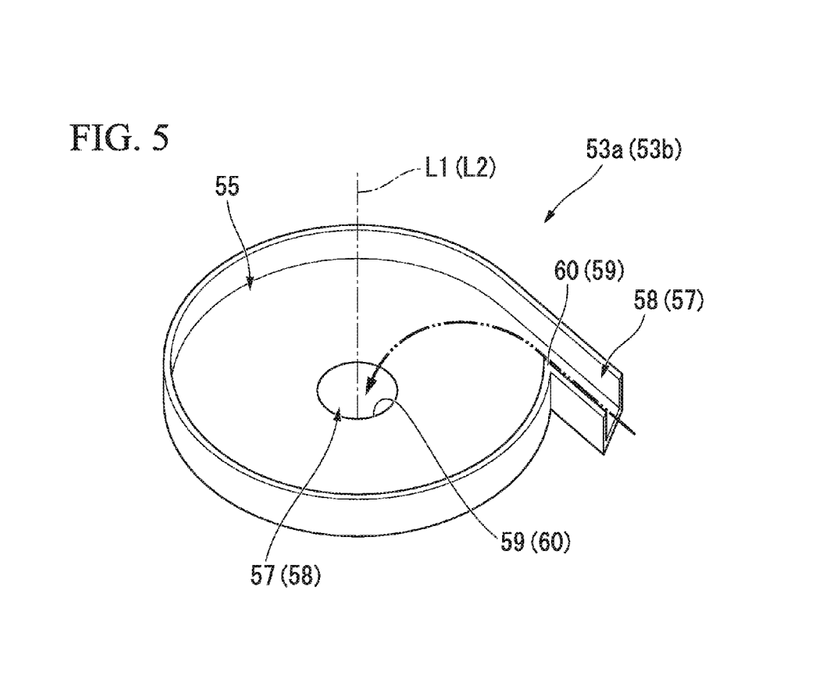
FIG. 5 is a schematic view of an intermediate chamber provided in the partition member shown in FIG. 2, and is a view showing the flow of a liquid in a case where the flow speed of the liquid is low.

As shown in FIGS. 1 and 4, in the first pressure loss unit 53a, the first communication passage 57 directly communicates with the main liquid chamber 14. The first communication passage 57 is formed in the top wall part of the first space-form part 38a. The first communication passage 57 opens to the facing wall surface 56 through the overhang part 42 in the top wall part in the direction of the axis O, and is disposed coaxially with the axis O. The first opening 59 opens toward a portion, which is formed by the elastic membrane 39, in the wall surface that defines the intermediate chamber 55.

Figure 3:
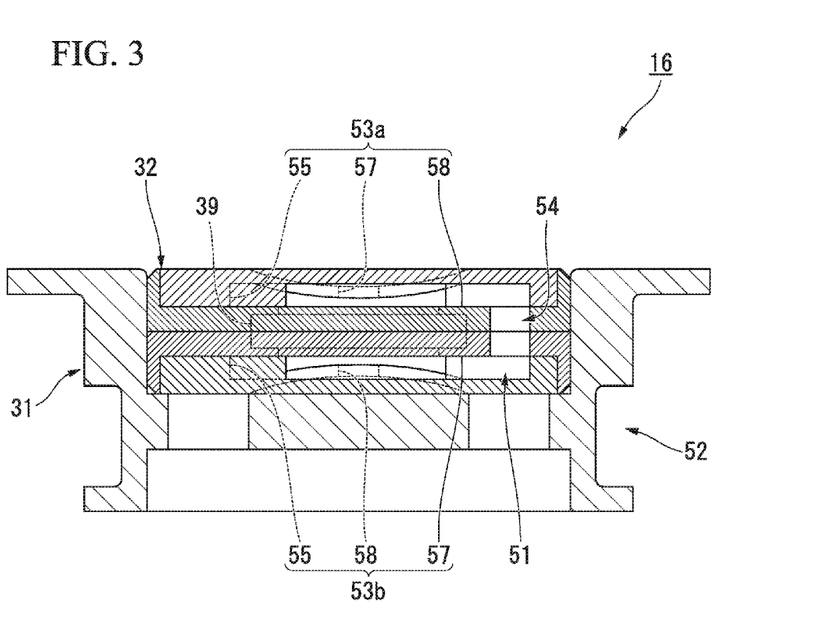
FIG. 3 is a cross-sectional view in the direction of arrow A-A shown in FIG. 2.

As shown in FIGS. 2 and 3, in the first pressure loss unit 53a, the second communication passage 58 linearly extends in a direction along an orthogonal plane orthogonal to the axis O. The second communication passage 58 extends from an inner peripheral surface of the intermediate chamber 55 in a tangential direction of the inner peripheral surface, and opens in a circumferential direction of the intermediate chamber 55 within the intermediate chamber 55. In the first pressure loss unit 53a, the first opening axis L1 extends in the direction of the axis O, and the second opening axis L2 extends in the above tangential direction. The second communication passage 58 forms a swirling flow of the liquid L within the intermediate chamber 55 according to the flow speed of the liquid L flowed into the intermediate chamber 55, and flows this liquid L flow out of the first communication passage 57. In addition, the liquid that has flowed into the intermediate chamber 55 through the second opening 60 from the second communication passage 58 is swirled by flowing along the inner peripheral surface of the intermediate chamber 55.

As shown in FIGS. 1 and 4, in the second pressure loss unit 53b, the second communication passage 58 directly communicates with the main liquid chamber 14, and the second opening 60 opens toward the wall surface that defines the intermediate chamber 55. The second communication passage 58 is formed in the bottom wall part of the second space-form part 38b. The second communication passage 58 opens to the facing surface 56 through the overhang part 42 in the bottom wall part in the direction of the axis O, and is disposed coaxially with the axis O. The second opening 60 opens toward a portion, which is formed by the elastic membrane 39, in the wall surface that defines the intermediate chamber 55.

As shown in FIGS. 2 and 3, in the second pressure loss unit 53b, the first communication passage 57 linearly extends in the direction along the orthogonal plane orthogonal to the axis O. The first communication passage 57 extends from the inner peripheral surface of the intermediate chamber 55 in the tangential direction of the inner peripheral surface, and opens in the circumferential direction of the intermediate chamber 55 within the intermediate chamber 55. In the second pressure loss unit 53b, the first opening axis L1 extends in the tangential direction, and the second opening axis L2 extends in the direction of the axis O. The first communication passage 57 forms a swirling flow of the liquid L within the intermediate chamber 55 according to the flow speed of the liquid L flowed into the intermediate chamber 55, and flows this liquid L out of the second communication passage 58. In addition, the liquid L that has flowed into the intermediate chamber 55 through the first opening 59 from the first communication passage 57 is swirled by flowing along the inner peripheral surface of the intermediate chamber 55.

As shown in FIG. 2, in the above plan view, the outer shape of the first pressure loss unit 53a and the outer shape of the second pressure loss unit 53b coincide with each other.

As shown in FIGS. 2 and 3, the connection passage 54 connects the second communication passage 58 of the first pressure loss unit 53a and the first communication passage 57 of the second pressure loss unit 53b together. The connection passage 54 is connected to an end of the second communication passage 58 of the first pressure loss unit 53a drat is located opposite to the second opening 60. The connection passage 54 is connected to an end of the first communication passage 57 of the second pressure loss unit 53b that is located opposite to the first opening 59. The connection passage 54 linearly extends in the direction of the axis O.

In the vibration-damping device 10 as shown in FIGS. 1 to 4, the first limiting passage 51 causes liquid column resonance with respect to the input of an idle vibration (for example a frequency of 18 Hz to 30 Hz and an amplitude of ±0.5 mm or less). Meanwhile, the second limiting passage 52 causes liquid column resonance with respect to the input of a shake vibration (for example, a frequency of 14 Hz or less and an amplitude of greater than ±0.5 mm). The frequency of the shake vibration (second vibration) is lower than the frequency of the idle vibration (first vibration). The amplitude of the shake vibration is greater than the amplitude of the idle vibration.

Each limiting passage 51 or 52 is set (tuned) such that liquid column resonance occurs when a respectively corresponding vibration is input on the basis of, for example, flow passage length, flow passage cross-sectional area, or the like, and the liquid L flows therethrough. For example, as the first limiting passage 51, a configuration or the like in which the resonant frequency of the second communication passage 58 of the first pressure loss unit 53a or the resonant frequency of the first communication passage 57 of the second pressure loss unit 53b is set to be same as the frequency of the idle vibration can be adopted.

In a state where vibration is not input, the flow resistance of the first limiting passage 51 is smaller than the flow resistance of the second limiting passage 52. In the vibration-damping device 10, the liquid L tends to flow the first limiting passage 51 more actively than the second limiting passage 52 immediately after vibration is input. In addition, the flow resistance of each limiting passage 51 or 52 can be adjusted on the basis of flow passage length, flow passage cross-sectional area, or the like.

Next, the operation of the vibration-damping device 10 be described.

That is, if vibration in the direction of the axis O is input to the vibration-damping device 10 from the vibration generating part, both the attachment members are displaced relative to each other, elastically deforming the elastic body 13, and the liquid pressure of the main liquid chamber 14 fluctuates. Then, the liquid L tends to reciprocate between the main liquid chamber 14 and the auxiliary liquid chamber 15. In this case, the liquid L within the main liquid chamber 14 and the auxiliary liquid chamber 15 tends to flow through the first limiting passage 51 having a smaller flow resistance, out of both the limiting passages 51 and 52.

Here, the amplitude of the idle vibration has a smaller amplitude than the shake vibration, and the flow speed of the liquid L at the time of the input of the idle vibration becomes smaller than the flow speed of the liquid L at the time of the input of the shake vibration.

That is, if the idle vibration is input in the direction of the axis O, a small amount of the liquid L per unit time tends to flow into the first limiting passage 51 according to the amplitude of this idle vibration. As a result, a rise in the flow speed of the liquid L that flows through the first limiting passage 51 is suppressed. Accordingly, the liquid L passes through a short path within the intermediate chamber 55 of the pressure loss units 53a and 53b, the pressure loss of the liquid L within the pressure loss units 53a and 53b is suppressed, and the liquid L smoothly flows through the first limiting passage 51. For example, as shown by a two-dot chain line in FIG. 5, the liquid L flowing into the intermediate chamber 55 from the second communication passage 58 in the first pressure loss unit 53a, the liquid L flowing into the intermediate chamber 55 from the first communication passage 57 in second pressure loss unit 53b, or the like flows without swirling inside the intermediate chamber 55 or flows with a small amount of swirling. Accordingly, the liquid L can be made to smoothly pass through the intermediate chamber 55, and an increase in the pressure loss of the liquid L can be suppressed. Therefore, it is possible to make the liquid L actively flow through the first limiting passage 51, and resonance can be caused within the first limiting passage 51 to absorb and dampen the idle vibration.

Meanwhile, if the shake vibration is input in the direction of the axis O, a large amount of the liquid L tends to flows into the first limiting passage 51 from the main liquid chamber 14 per unit time according to the amplitude of this shake vibration. As a result, the flow speed of the liquid L that flows through the first limiting passage 51 is increased to a speed equal to or higher than a certain speed.

In the vibration-damping device 10 as shown in FIGS. 1 and 4, when the liquid L within the main liquid chamber 14 tends to flow toward the auxiliary liquid chamber 15 side through the first limiting passage 51, first, the liquid L flows into the first pressure loss unit 53a from the main liquid chamber 14. In this case, if the flow speed of the liquid L that flows into the intermediate chamber 55 through the first communication passage 57 is raised, the liquid L that has flowed into the intermediate chamber 55 from the first opening 59 flows straight in the direction of the axis O (in the direction of the first opening axis L1) inside the intermediate chamber 55. As a result, after the liquid L reaches a portion formed by the elastic membrane 39 in a wall surface that defines the intermediate chamber 55 and is changed in flow along the wall surface, the liquid reaches the second opening 60 and flows out of the intermediate chamber 55. Hence, in a case where the shake vibration is input, compared to a case where the idle vibration is input, the liquid L can be flowed along a tong path within the intermediate chamber 55, and friction can be caused between the liquid L and the wall surface of the intermediate chamber 55. As a result, the pressure loss of the liquid L can be increased due to an energy loss, the viscous resistance of the liquid L, or the like.

The liquid L that has flowed through the first pressure loss unit 53a reaches the second pressure loss unit 53b through the connection passage 54. In this case, the liquid L flows into the intermediate chamber 55 from the first opening 59 after being straightened in the above tangential direction by flowing through the first communication passage 57. Then, the liquid L swirls within the intermediate chamber 55 as shown by the two-dot chain line in FIG. 6. That is, if the flow speed of the liquid L is raised when the liquid L flows into the intermediate chamber 55 the first opening 59, this liquid L flows straight inside the intermediate chamber 55, reaches the inner peripheral surface (wall surface) of the intermediate chamber 55, and is changed in flow along this inner peripheral surface.

Figure 6:
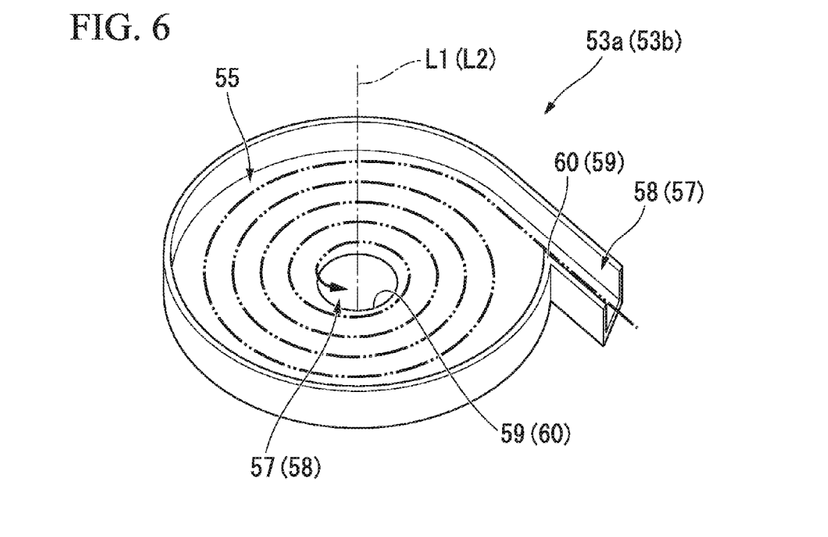
FIG. 6 is a schematic view of the intermediate chamber provided in the partition member shown in FIG. 2, and is a view showing the flow of the liquid in a case where the flow speed of the liquid is high.

As a result, for example, the pressure loss of the liquid L increases due to the viscous resistance of the liquid L, an energy loss caused by forming a swirling flow, an energy loss caused by the friction between the liquid L and the wall surface of the intermediate chamber 55, or the like. In addition, in this case, if the flow rate of the liquid L that flows into the intermediate chamber 55 rises markedly with a rise in the flow speed of the liquid L, the inside of the intermediate chamber 55 is filled with the swirling flow formed by the liquid L that has flowed into the intermediate chamber 55. In this state, in a case where the liquid L tends to further flow into the intermediate chamber 55, the pressure loss of the liquid L can be increased. The liquid L swirled within the intermediate chamber 55 flows out of the second opening 60, and flows into the auxiliary liquid chamber 15.

In the vibration-damping device 10 shown in FIGS. 1 and 4, when the liquid L within the auxiliary liquid chamber 15 tends to flow toward the main liquid chamber 14 side through the first limiting passage 51, first, the liquid L flows into the second pressure loss unit 53b from the auxiliary liquid chamber 15. In this case, if the flow speed of the liquid L that flows into the intermediate chamber 55 through the second communication passage 58 is raised, the liquid L that has flowed into the intermediate chamber 55 from the second opening 60 flows straight in the direction of the axis O (in the direction of the second opening axis L2) inside the intermediate chamber 55. As a result, after the liquid L reaches portion formed by the elastic membrane 39 in the wall surface that defines the intermediate chamber 55 and is changed in flow along the wall surface, the liquid L reaches the first opening 59 and flows out of the intermediate chamber 55. Accordingly, it is possible to make the liquid L flow along a long path within the intermediate chamber 55, cause friction between the liquid L and the wall surface of the intermediate chamber 55, and the pressure loss of the liquid L can be increased.

The liquid L that has flowed through the second pressure loss unit 53b reaches the first pressure loss unit 53a through the connection passage 54. In this case, the liquid L flows into the intermediate chamber 55 from the second opening 60 after being straightened in the above tangential direction by flowing through the second communication passage 58. Then, the liquid L swirls within the intermediate chamber 55 as shown by the two-dot chain line in FIG. 6. That is, if the flow speed of the liquid L is raised when the liquid L flows into the intermediate chamber 55 from the second opening 60, this liquid L flows straight inside the intermediate chamber 55, reaches the inner peripheral surface (wall surface) of the intermediate chamber 55, and is changed in flow along this inner peripheral surface and thereby the pressure loss of the liquid L increases. After that, the liquid L flows into the main liquid chamber 14 from the first opening 59.

As described above, in the vibration-damping device 10 as shown in FIGS. 1 and 4, when the shake vibration is input, the pressure loss of the liquid L increases in both the first pressure loss unit 53a and the second pressure loss units 53b. This can make it difficult for the liquid L to flow through the first limiting passage 51, thereby making the liquid L easily flow through the second limiting passage 52. In this case, as the liquid L flows through the second limiting passage 52, resonance can be caused within the second limiting passage 52, and the shake vibration can be absorbed and dampened.

Meanwhile, if the shake vibration is input and resonance occurs in the second limiting passage 52, the liquid pressure of the main liquid chamber 14 greatly fluctuates with this resonance. Here, in the vibration-damping device 10, the first communication passage 57 of the first pressure loss unit 53a directly communicates with the main liquid chamber 14, and in the first pressure loss unit 53a, the portion that faces the first opening 59 in the wall surface that defines the intermediate chamber 55 is formed by the elastic membrane 39. Therefore, if the liquid pressure of the main liquid chamber 14 fluctuates greatly, this liquid pressure can be radially transmitted to the elastic membrane 39 through the first communication passage 57 and the intermediate chamber 55 in the first pressure loss unit 53a. As a result, the elastic membrane 39 can be elastically deformed on the basis of fluctuations of the liquid pressure of the main liquid chamber 14.

In the present embodiment, the intermediate chamber 55 of the first pressure loss unit 53a and the intermediate chamber 55 of the second pressure loss unit 53b are adjacent to each other with the elastic membrane 39 interposed therebetween. Therefore, when the shake vibration is input, the elastic membrane 39 is elastically deformed to the intermediate chamber 55 side of the first pressure loss unit 53a or the intermediate chamber 55 side of the second pressure loss unit 53b, on the basis of the difference between the liquid pressure received from the intermediate chamber 55 of the first pressure loss unit 53a and the liquid pressure received from the intermediate chamber 55 of the second pressure loss unit 53b. Here, in the vibration-damping device 10, the second communication passage 58 of the second pressure loss unit 53b directly communicates with the auxiliary liquid chamber 15, and in the second pressure loss unit 53b, the portion that faces the second opening 60 in the wall surface that defines the intermediate chamber 55 is formed by the elastic membrane 39. Therefore, when the shake vibration is input, the liquid pressure that the elastic membrane 39 receives from the intermediate chamber 55 of the second pressure loss unit 53b can be made equal to the liquid pressure of the auxiliary liquid chamber 15. In the present embodiment, since the auxiliary liquid chamber 15 is closed by the diaphragm 17 and the pressure inside the auxiliary liquid Chamber 15 is equal to the atmospheric pressure, the liquid pressure that the elastic membrane 39 receives from the intermediate chamber 55 of the second pressure loss unit 53b can be made equal to the atmospheric pressure. Accordingly, it is possible to increase the difference the liquid pressure that the elastic membrane 39 receives from the intermediate chamber 55 of the first pressure loss unit 53a and the liquid pressure that the elastic membrane 39 receives from the intermediate chamber 55 of the second pressure loss unit 53b, and the elastic membrane 39 can be elastically deformed to the intermediate chamber 55 side of the first pressure loss unit 53a or the intermediate chamber 55 side of the second pressure loss unit 53b.

If the elastic membrane 39 is deformed to the intermediate chamber 55 side of the first pressure loss unit 53a, the first opening 59 of the first pressure loss unit 53a can be closed by the elastic membrane 39. If the elastic membrane 39 is deformed to the intermediate chamber 55 side of the second pressure loss unit 53b, the second opening 60 of the second pressure loss unit 53b can be closed by the elastic membrane 39. In this case, the liquid L can be made it more difficult to flow through the first limiting passage 51 by closing the first opening 59 in the first pressure loss unit 53a or the second opening 60 of the second pressure loss unit 53b with the elastic membrane 39. Accordingly, the liquid L can be made to easily flow through the second limiting passage 52. Therefore, for example, even if a small amplitude of vibration of the shake vibration is input, the liquid L can be made to reliably flow through the second limiting passage 52. As a result, even the shake vibration with a small amplitude can be reliably absorbed and dampened.

In addition, in the present embodiment, the facing wall surfaces 56 in the pressure loss units 53a and 53b are formed in the shape of a convexly curved surface that becomes convex toward the elastic membrane 39. Therefore, when the elastic membrane 39 is elastically deformed to close the first opening 59 of the first pressure loss unit 53a or the second opening 60 of the second pressure loss unit 53b, the contact area between the elastic membrane 39 and the wall surface of the intermediate chamber 55 can be gradually increased. Accordingly, for example, generation of striking sound can be suppressed.

As described above, according to the vibration-damping device 10 related to the present embodiment, by providing the pressure loss units 53a and 53b in the first limiting passage 51 instead of providing the plunger member as in the related art in the partition member 16, it is possible to absorb and damp both a shake vibration and an idle vibration, and simplification of the structure of the vibration-damping device 10 and facilitation of the manufacture thereof can be achieved.

In addition, the technical scope of the invention is not limited to the above embodiments, and various changes can be made without departing from the concept of the invention.

In the above embodiments, in the first pressure loss unit 53a, the second communication passage 58 forms the swirling flow of the liquid L within the intermediate chamber 55 according to the flow speed of the liquid L flowed into the intermediate chamber 55, and flows this liquid L out of the first communication passage 57. However, the invention is not limited to this. In the first pressure loss unit 53a, it is not necessary to swirl the liquid L flowed in from the second communication passage 58.

For example, in the first pressure loss unit 53a, the second communication passage 58 may extend linearly in the radial direction of the intermediate chamber 55 from the inner peripheral surface of the intermediate chamber 55. In the first pressure loss unit 53a, the second communication passage 58 may extend linearly in the direction of the axis O of the intermediate chamber 55 from the end surface of the intermediate chamber 55 that faces the direction of the axis O. Even in these cases, by making the second opening 60 open the wall surface of the intermediate chamber 55, it is possible to enhance the flow speed of the liquid L that flows into the intermediate chamber 55 from the second opening 60 when the shake vibration is input and the flow speed of the liquid L is raised. As a result, the liquid L can be flowed straight within the intermediate chamber 55, and the pressure loss of the liquid L can be increased.

In the above embodiments, in the second pressure loss unit 53b, the first communication passage 57 forms the swirling flow of the liquid L within the intermediate chamber 55 according to the flow speed of the liquid L flowed into the intermediate chamber 55, and flows this liquid L out of the second communication passage 58. However, the invention is not limited to this. In the second pressure loss unit 53b, it is not necessary to swirl the liquid L flowed in from the first communication passage 57.

For example, in the second pressure loss unit 53b, the first communication passage 57 may extend linearly in the radial direction of the intermediate chamber 55 from the inner peripheral surface of the intermediate chamber 55. In the second pressure loss unit 53b, the first communication passage 57 may extend linearly in the direction of the axis O of the intermediate chamber 55 from the end surface of the intermediate chamber 55 that faces the direction of the axis O. Even in these cases, by making the first opening 59 open toward the wall surface of the intermediate chamber 55, it is possible to enhance the flow speed of the liquid L that flows into the intermediate chamber 55 from the first opening 59 when the shake vibration is input and the flow speed of the liquid L is raised. As a result, the liquid L can be flowed straight within the intermediate chamber 55, and the pressure loss of the liquid L can be increased.

In the above embodiments, the first pressure loss unit 53a and the second pressure loss unit 53b are provided as the pressure loss units 53a and 53b. However, the invention is not limited to this.

For example, a pressure loss unit at is different from the first pressure loss unit 53a or the second pressure loss unit 53b may be further provided in the connection passage 54.

Moreover, for example, there may be no second pressure loss unit 53b, and the first limiting passage 51 may be constituted of the first pressure loss unit 53a. In this case, a configuration or the like can be adopted in which the elastic membrane 39 is disposed between the intermediate chamber 55 of the first pressure loss unit 53a, and the auxiliary liquid chamber 15, and the elastic membrane 39 is exposed to the auxiliary liquid chamber 15. Furthermore, a configuration or the like may be adopted in which an atmospheric pressure chamber which is connecting to the outside of the partition member 16 and of which the internal pressure is the atmospheric pressure is provided within the partition member 16, the elastic membrane 39 is disposed between the intermediate chamber 55 of the first pressure loss unit 53a, and the atmospheric pressure chamber, and the elastic membrane 39 is exposed to the atmospheric pressure chamber.

In the above embodiments, the inside of the second limiting passage 52 or the inside of the first communication passage 57 or the second communication passage 58 of each of the pressure loss units 53a and 53b, may be closed, for example, by a membrane body that is elastically deformed by the liquid pressure of the liquid L, such as an elastic thin membrane. Even in this case, the liquid L flows through the inside of the second limiting passage 52, the inside of the first communication passage 57, and the inside of the second communication passage 58 by the liquid pressure of the liquid L located on both sides of the membrane body being transmitted via the membrane body.

Additionally, there may not be the overhang part 42.

Additionally, in the above embodiments, the partition member 16 partitions the liquid chamber within the first attachment member 11 into the main liquid chamber 14 having the elastic body 13 on a portion of the wall surface thereof, and the auxiliary liquid chamber 15. However, the invention is not limited to this. For example, a pair of elastic bodies in the axis direction instead of the above diaphragm 17, or a pressure-receiving liquid chamber having an elastic body on a portion of the wall surface thereof may be provided instead of providing the auxiliary liquid chamber 15.

That is, the partition member may be appropriately changed to another configuration in which the liquid chamber within the first attachment member in which a liquid is enclosed is split into the first liquid chamber and the second liquid chamber, and at least one of both the liquid chambers of the first liquid chamber and the second liquid chamber has an elastic body on a portion of the wall surface thereof.

Additionally, in the above embodiment, an engine is connected to the second attachment member 12 and the first attachment member 11 is connected to a vehicle body. Contrary to this, however, a configuration may be adopted in which the engine is connected to the first attachment member 11 and the second attachment member 12 is connected to the vehicle body.

Moreover, the vibration-damping device 10 related to the invention is not limited to engine mounts of vehicles and can also be applied to those other than the engine mounts. For example, the invention can also be applied to mounts of generators loaded on construction machines, or can also be applied to mounts of machines installed in factories or the like.

In addition, the constituent elements in the above embodiment can be substituted with well-known constituent elements without departing from the concept of the invention, and the above modification example may be appropriately combined together.

INDUSTRIAL APPLICABILITY

According to the invention, simplification of structure and facilitation of manufacture in the vibration-damping device can be achieved.

REFERENCE SIGNS LIST

10: VIBRATION-DAMPING DEVICE
11: FIRST ATTACHMENT MEMBER
12: SEC(I)NI) ATTACHMENT MEMBER
13: ELASTIC BODY
14: MAIN LIQUID CHAMBER (FIRST LIQUID CHAMBER)
15: AUXILIARY LIQUID CHAMBER (SECOND LIQUID CHAMBER)
16: PARTITION MEMBER
39: ELASTIC MEMBRANE
51: FIRST LIMITING PASSAGE
52: SECOND LIMITING PASSAGE
53*a*: FIRST PRESSURE LOSS UNIT
53*b*: SECOND PRESSURE LOSS UNIT
55: INTERMEDIATE CHAMBER
57: FIRST COMMUNICATION PASSAGE
58: SECOND COMMUNICATION PASSAGE
59: FIRST OPENING
60: SECOND OPENING
L1: FIRST OPENING AXIS
L2: SECOND OPENING AXIS

What is claimed is:

1. A vibration-damping device comprising:
a tubular first attachment member coupled to any one of a vibration generating part and a vibration receiving part, and a second attachment member coupled to the other thereof;
an elastic body coupling both of the attachment members; and
a partition member that partitions a liquid chamber within the first attachment member having a liquid enclosed therein into a first liquid chamber and a second liquid chamber,
wherein at least the first liquid chamber of the first liquid chamber and the second liquid chamber has the elastic body on a portion of a wall surface thereof,
wherein a limiting passage that allows the first liquid chamber and the second liquid chamber to communicate with each other is formed in the partition member,
wherein a first limiting passage of the limiting passage that resonates with input of a first vibration, and a second limiting passage of the limiting passage that resonates with input of a second vibration with a greater amplitude than the amplitude of the first vibration,
wherein the first limiting passage includes a pressure loss unit that causes a loss in the pressure of the liquid that flows therethrough,
wherein the pressure loss unit is provided with an intermediate chamber disposed in the partitioning member, a first communication passage that allows the intermediate chamber and the first liquid chamber to communicate with each other, and a second communication passage that allows the intermediate chamber and the second liquid chamber to communicate with each other,
wherein the intermediate chamber is formed in a circular shape in plan view,
wherein an opening axis of a first opening that opens toward an inside of the intermediate chamber in the first communication passage and an opening axis of a second opening that opens toward an inside of the intermediate chamber in the second communication passage are offset from each other,
wherein at least one of the first opening and the second opening opens toward a wall surface that defines the intermediate chamber,
wherein a first pressure loss unit of the pressure loss unit in which the first communication passage directly communicates with the first liquid chamber and the first opening opens toward the wall surface that defines the intermediate chamber, and
wherein, in the first pressure loss unit, a portion that faces the first opening and that is in the wall surface that defines the intermediate chamber is formed by the elastic membrane,
wherein any one of the first communication passage and the second communication passage opens in a circumferential direction of the intermediate chamber within the intermediate chamber, and
wherein a swirling flow of the liquid is formed within the intermediate chamber according to a flow speed of the liquid flowed into the intermediate chamber, and
wherein the liquid is flowed out of the other of the first communication passage and the second communication passage.

2. The vibration-damping device according to claim 1,
wherein a second pressure loss unit of the pressure loss unit in which the second communication passage directly communicates with the second liquid chamber and the second opening opens toward the wall surface that defines the intermediate chamber,
wherein the intermediate chamber of the first pressure loss unit and the intermediate chamber of the second pressure loss unit are adjacent to each other with the elastic membrane interposed therebetween, and
wherein, in the second pressure loss unit, a portion that faces the second opening and that is in the wall surface that defines the intermediate chamber is formed by the elastic membrane.

3. The vibration-damping device according to claim 1,
wherein, in the first pressure loss unit, a portion, which is provided with the first opening and faces the elastic membrane, in the wall surface that defines the intermediate chamber is formed in the shape of a convexly curved surface that becomes convex toward the elastic membrane.

* * * * *